United States Patent [19]
Karmel

[11] Patent Number: 4,575,367
[45] Date of Patent: Mar. 11, 1986

[54] SLIP SPEED SENSOR FOR A MULTIPLE LINK BELT DRIVE SYSTEM

[75] Inventor: Amir Karmel, Birmingham, Mich.

[73] Assignee: General Motors Corporation, Detroit, Mich.

[21] Appl. No.: 638,070

[22] Filed: Aug. 6, 1984

[51] Int. Cl.⁴ ............................................. F16H 7/22
[52] U.S. Cl. .......................................... 474/106; 73/9
[58] Field of Search .................. 474/101, 102, 106; 33/1 PT, 125 C; 73/9

[56] References Cited

U.S. PATENT DOCUMENTS

| | | | |
|---|---|---|---|
| 2,887,874 | 5/1959 | Mason | 73/9 |
| 3,033,018 | 5/1962 | Haggadone | 73/9 |
| 3,972,221 | 8/1976 | Natens et al. | 73/9 |
| 4,449,191 | 5/1984 | Mehnert | 33/1 PT X |

FOREIGN PATENT DOCUMENTS

| | | |
|---|---|---|
| 2755424 | 6/1979 | Fed. Rep. of Germany . |
| 621978 | 8/1978 | U.S.S.R. ............ 73/9 |

*Primary Examiner*—John M. Jillions
*Assistant Examiner*—Katherine Matecki
*Attorney, Agent, or Firm*—Donald F. Scherer

[57] ABSTRACT

A slip sensing mechanism for a multilink or articulated belt drive includes a flexible arm on which is disposed a roller maintained in abutment with the belt. The flexible arm has formed integrally therewith or otherwise secured thereto a strain gauge which will provide a measurement proportional to the deflection of the arm. This deflection is indicative of the radius at which the belt is operating relative to a pulley. The roller in abutting the individual link members of the belt causes an oscillating or AC component which is measured by the strain gauge. This AC component is proportional to the speed at which the belt passes thereunder. It is possible by knowing the rotary speed of the pulley and the radius by which the belt is operating to calculate the slip speed, if any, of the belt relative to the pulley by obtaining the difference between the product of pulley speed and belt radius and the product of link width and frequency. These measurements and calculations are easily manipulated by a conventional digital computer to provide a value for slip speed which can be used for correction to the pulley drive system.

2 Claims, 5 Drawing Figures

SLIP SPEED SENSOR FOR A MULTIPLE LINK BELT DRIVE SYSTEM

This invention relates to measuring devices and more particularly to speed measuring devices.

It is an object of this invention to provide an improved measuring mechanism for a slip sensing apparatus used with a belt drive wherein a strain gauge is secured to a flexible follower arm held in contact with the belt member and wherein the strain gauge will take measurements proportional to both the operating radius of the belt and the linear speed of the belt.

It is another object of this invention to provide an improved apparatus for determining the presence and amount of slip between the belt and pulley sheave wherein the belt is comprised of a plurality of individual link members of predetermined thickness and one or more continuous band members for maintaining the link members in a continuous loop and wherein the apparatus includes sensing means for determining the rotational speed of the pulley sheave, flexible arm and sensing means for simultaneously determining the radius at which the belt is operating on the pulley sheave and the frequency of the links passing the sensing means and a processing unit for determining the difference between the product of sheave speed and belt radius and the product of link width and frequency of the links passing the sensing means.

These and other object and advantages of the present invention will be more apparent from the following description and drawings in which.

Figure 1:
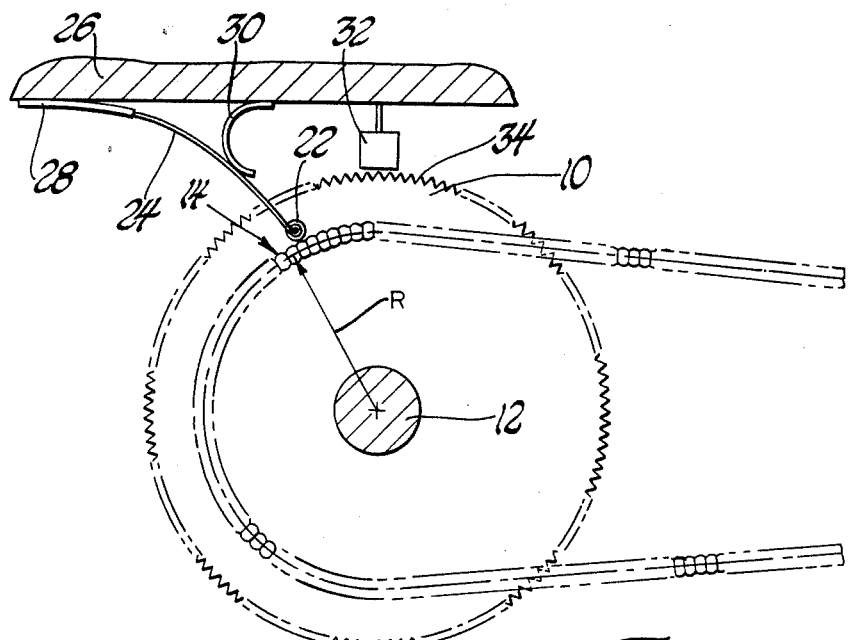
FIG. 1 is a diagrammatic representation of a pulley and belt arrangement.

Referring to the drawings, there is seen in FIG. 1 a drive pulley 10 rotatably fixed to a shaft 12 and frictionally drive related to a belt 14. The pulley 10 is a V-groove type pulley in which the two pulley sheave members can be moved relative to each other to provide a variable drive radius R for the belt 14. Such drive systems, as is well-known, provide a variable drive system between the drive shafts connected to respective pulleys. An example of such a drive system or transmission is described in U.S. Pat. No. 4,403,974 issued to Sherman et al. on Sept. 13, 1983, and assigned to the assignee of this application.

Figure 2:
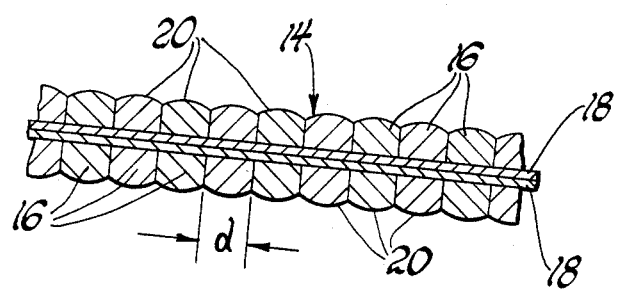
FIG. 2 is a view of a portion of the belt shown in FIG. 1.

The belt 14 is represented in FIG. 2 by a plurality of links or blocks 16 which are individual members maintained in a continuous loop by a plurality of continuous steel band members such as 18. This type of drive belt is well-known and is commonly termed a metal "V" belt. Each of the individual links 16 has a thickness d and a curved surface 20.

Figure 3:
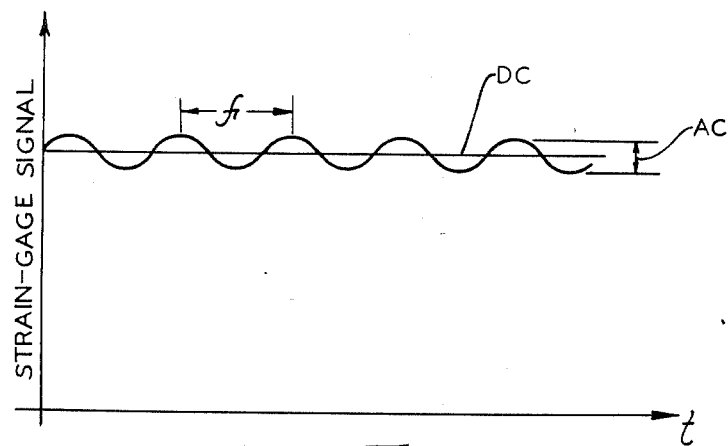
FIG. 3 is a curve depicting the output signal of the strain gauge utilized in the apparatus.

As the belt 14 traverses the pulley 10, it is abutted by a roller 22 rotatably fixed on a flexible arm member 24. The flexible arm member is secured to a housing 26. The flexible arm member 24 has secured thereto or integrally formed therewith a strain gauge 28. A spring member 30 urges the flexible arm away from housing 26 to maintain the roller 22 in contact with the outer surface of the belt 14. This imposes a strain on the strain gauge 28 which is exhibited as the DC or average value of the strain gauge signal shown in FIG. 3. As the drive radius R of the pulley 10 is changed, the DC component of the strain gauge signal will also change proportional thereto. The roller 22 also responds to the curved surface 20 of each of the links 16 such that an AC or oscillating signal is also imposed on the strain gauge as seen in FIG. 3. This oscillating or AC signal has a frequency f. The frequency f is proportional to the linear speed of the belt 14 and will vary as the speed of the belt 14 varies.

There is also seen in FIG. 1 a magnetic pick-up 32 which generates a speed signal for the pulley 10. This speed signal is established by teeth 34 formed on the outer diameter of pulley 10. Thus electric signals proportional to or indicative of the drive radius R, the pulley speed W and the linear speed frequency f of belt 14 are provided. Also, the width or thickness d of each of the links 16 is known. The product $d \cdot f$ is representative of the speed of belt 14 while the product $W \cdot R$ is indicative of the linear speed of the pulley 10 of the drive radius R. Therefore, slip is proportional to $|W \cdot R - d \cdot f|$. Knowing the slip speed, it is possible to adjust the force on the pulley 10 to eliminate the slip between the belt 14 and the pulley 10.

Figure 4:
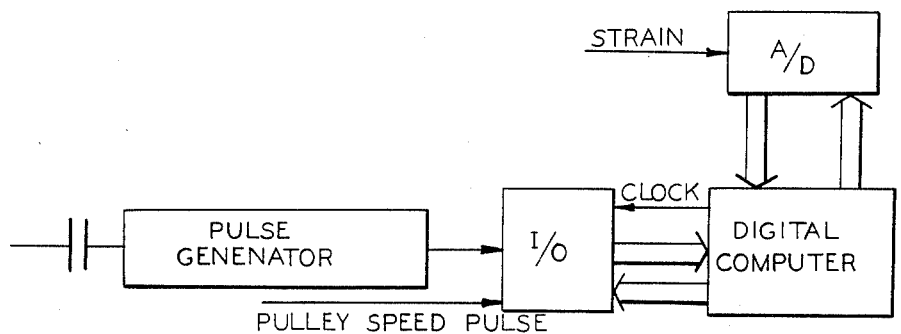
FIG. 4 is a diagrammatic representation of a computer and its input devices.
Figure 5:
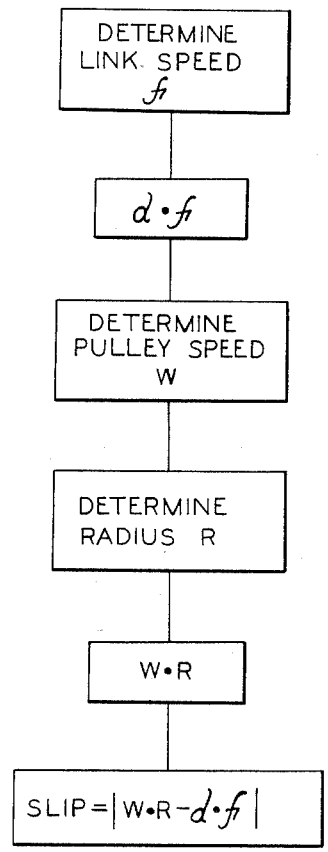
FIG. 5 is a flow diagram of the operation of the computer shown in FIG. 4.

FIG. 4 is a schematic representing a digital computer and some of its peripheral devices. One such device is an analog-to-digital converter which receives an input signal from the strain gauge 28 such that a signal proportional to the drive radius R is given to the computer. A conventional pulse generator is used to pass only the AC signal of the strain gauge 28 to an input/output (I/O) device for the computer, also, the pulley speed pulse as measured by the magnetic pick-up 32 is input to the I/O device. The digital computer then handles these signals in accordance with the flow diagram shown in FIG. 5 to calculate the slip speed, if any, between the pulley 10 and the belt 14. The pulley 10 can be controlled by a hydraulic mechanism in a well-known manner such that the slip speed indication can be utilized to increase the force on the pulley 10 and therefore the normal force on belt 14 so that an increase in the frictional drive forces will occur and the slip speed will be reduced.

The embodiments of the invention in which an exclusive property or privilege is claimed are defined as follows:

1. Apparatus for determining the presence and amount of slip between a belt and sheave wherein the belt operates at various drive radii on the pulley and is comprised of a plurality of individual link members of a predetermined thickness measured in the longitudinal direction of the belt and one or more continuous band members for maintaining the links in a continuous loop, said apparatus comprising: sensing means for determining the rotational speed of the sheave; flexible arm sensing means for determining the drive radius of said belt on said sheave and also for determining the number of links passing the flexible arm sensing means in a predetermined time; means for determining the product of the sheave speed and the belt radius and the product of the thickness of the links and the number of links passing said flexible arm sensing means in a predetermined time; and means for determining the difference between the two products to indicate the presence and amount of slip between the sheave and the belt.

2. Apparatus for determining the presence and amount of slip between a belt and pulley wherein the belt is comprised of a plurality of individual link members of a predetermined thickness measured in the longitudinal direction of the belt and one or more continuous band members for maintaining the links in a continuous loop, said belt operating at various drive radii on the pulley, said apparatus comprising: sensing means for determining the rotational speed of the pulley; flexible arm sensing means for simultaneously sensing the drive radius of the belt and the frequency of the belt links passing the flexible arm sensing means in a predetermined time; and means for determining belt slip including means for calculating the product of the pulley speed and the drive radius and the product of the thickness of the links and the passing frequency of the links; and means for calculating the difference the two products to indicate the presence and amount of slip between the belt and pulley.

* * * * *